United States Patent [19]

Onuki et al.

[11] Patent Number: 5,003,323

[45] Date of Patent: Mar. 26, 1991

[54] THERMAL LINE PRINTER WITH AN ARRAY OF HEATING ELEMENTS LINEARLY ARRANGED ALONG THE LONGITUDINAL INSIDE EDGE PORTIONS OF A PLURALITY OF LONGITUDINALLY STAGGERED HEAD SEGMENTS

[75] Inventors: Hideki Onuki; Mitsuhiro Kaiya; Seishi Shimada, all of Tokyo, Japan

[73] Assignee: Seiko Instruments Inc., Japan

[21] Appl. No.: 407,405

[22] Filed: Sep. 14, 1989

[51] Int. Cl.$^5$ .......................... G01D 15/10; B41J 2/32; B41J 2/345

[52] U.S. Cl. ................................ 346/76 PH; 400/120

[58] Field of Search ......................... 346/76 R, 76 PH; 400/120

[56] References Cited

U.S. PATENT DOCUMENTS 4,063,254 12/1977 Fox ........................................ 346/75

4,660,052 4/1987 Kaiya ............................. 346/76 PH

*Primary Examiner*—Bruce A. Reynolds

*Assistant Examiner*—Scott A. Rogers

*Attorney, Agent, or Firm*—Bruce L. Adams; Van C. Wilks

[57] ABSTRACT

A thermal line head device operates while a recording medium is fed in a vertical direction for printing dots line-sequentially along a horizontal direction according to bit image data corresponding to dots. A plurality of longitudinal head segments have a plurality of heating elements effective to print dots according to the corresponding bit image data, and linearly arranged along a longitudinal edge portion of the segment and deviated from a longitudinal center portion of the segment. The head segment are arranged in staggered relation along upstream and downstream rows such that the longitudinal edge portions of segments are opposed adjacently to each other in parallel between the rows so that the heating elements are linearly arranged in the horizontal direction between the rows a given vertical spacing. A line memory stores bit image data and distributes the stored bit image data to the heating elements in synchronization with vertical feeding of recording medium through the given vertical spacing.

10 Claims, 2 Drawing Sheets

THERMAL LINE PRINTER WITH AN ARRAY OF HEATING ELEMENTS LINEARLY ARRANGED ALONG THE LONGITUDINAL INSIDE EDGE PORTIONS OF A PLURALITY OF LONGITUDINALLY STAGGERED HEAD SEGMENTS

BACKGROUND OF THE INVENTION

The present invention relates to a thermal line printer of the type having a segmented line head composed of a plurality of linear thermal head segments aligned in the widthwise direction of a recording medium sheet perpendicular to the feeding direction or the lengthwise direction of the recording medium sheet so as to cover the entire span or width of the recording medium sheet.

One type of conventional segmented line head is composed of a plurality of linear thermal head segments aligned in a single row and coupled to each other at opposed ends of adjacent segments. Each linear segment has a given length sufficient to cover the span of A4 or B4 size recording paper and is formed with a plurality of heating elements arranged linearly on the segment at a given pitch. These linear head segments are connected in series to each other to constitute the line head which can cover the entire length of larger size recording paper such as A1 size and A0 size, and which has a higher yield rate than that of monolithic line head of comparative length.

However this type of conventional segmented line head has the drawback that the pitch of the heating elements is made irregular at the junction or connecting portion of adjacent segments which degrades the quality of the printed image pattern.

Another type of conventional segmented line head is disclosed in U.S. Pat. No. 4,660,052. This conventional head is composed of a plurality of linear thermal head segments aligned in a pair of parallel rows in staggered relation and in partially overlapping relation at end portions of the linear segments between the parallel rows so as to completely cover the entire width of recording paper. In operation, the first row of linear segments is activated to effect a part of single line printing, and then the recording paper is advanced through an interval corresponding to the distance between the parallel rows and the second row of linear segments is activated to effect the remaining part of the single line printing to thereby complete the single line printing. In such operation, in order to avoid duplicate printing by the overlapping portion of the staggered segments between the first and second rows, a predetermined number of heating elements are blanked during each line printing operation at the overlapping portion of the staggered linear segments.

During the starting period of the line-sequential operation in the vertical direction, a head segment in the downstream row is blanked until the head segment reaches the starting line printed by another head segment in the upstream row through the vertical distance or gap between the pair of rows. The line thermal printer is provided with a line memory for storing bit image data to be distributed to the head segments. A buffer line memory is also provided for temporarily storing bit image data to be distributed to the head segment in the downstream row during the starting period. The capacity of the extra buffer memory is determined according to the gap between the pair of parallel rows.

FIG. 3 shows a staggered arrangement of the head segments in the prior art. An individual head segment 11 is comprised of a longitudinal substrate formed with a plurality of electrically resistive heating elements aligned linearly along a lengthwise center line 11*a* substrate. Such structure of the head segment is referred to as "center type" hereinafter. As shown in FIG. 3, the first or upstream row of the linearly aligned hearing elements is spaced from the second or downstream row of the linearly aligned heating elements a relatively long distance in the vertical direction when utilizing the center type segments. The more the distance between the parallel rows of the heating elements, the more the extra memory area or capacity needed to store temporarily the image bit data. Generally, the line memory of the type used in the thermal line printer is very expensive in view of its great memory capacity to meet the width of the recording medium and the line density in the lengthwise direction thereof. Further, the more the gap between the parallel rows of the heating elements, the more the complicated control structure is needed to align linearly the dots printed by the parallel rows of heating elements.

SUMMARY OF THE INVENTION

An object of the present invention is to provide an improved staggered arrangement of head segments of the edge type effective to reduce the gap distance between the pair of heating element rows to thereby save the capacity of buffer line memory.

Another object of the present invention is to provide an improved staggered arrangement such that the number of segments in the downstream row is set smaller than that of the segments in the upstream row to thereby save the capacity of buffer line memory.

DETAILED DESCRIPTION OF PREFERRED EMBODIMENTS

Figure 1:
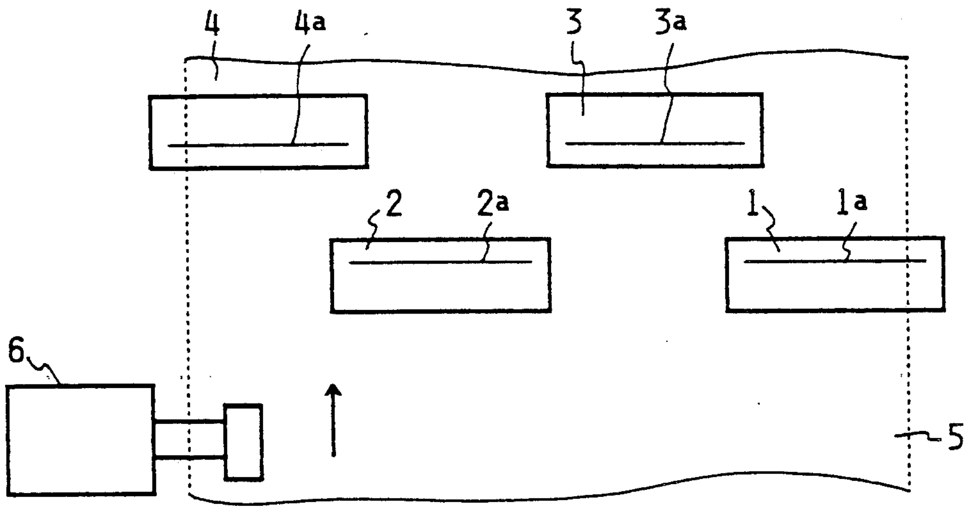
FIG. 1 is a schematic plan view of one embodiment of the thermal line printer according to the invention.

FIG. 1 shows one embodiment of the line thermal printer according to the present invention. The printer is comprised of a plurality of elongate thermal line head segments of the edge type 1 to 4. Each of the edge type segments 1 to 4 is composed of a longitudinal substrate formed with electroresistive heating elements 1*a*, 2*a*, 3*a* or 4*a* linearly aligned closely along a longitudinal edge portion of the substrate and deviated from the longitudinal center portion of the substrate. The edge type segments 1 to 4 are arranged in staggered relation such that the pair of edge type segments 1 and 2 are disposed in an upstream row and the other pair of edge type segments 3 and 4 are disposed in a downstream row with respect to the feeding or vertical direction of a recording paper 5 as shown by the arrow in the figure so as to cover the entire span or width of the recording paper 5. As shown in FIG. 1, the head segments 1–4 are disposed so that the marginal edge portions thereof along which extend the linear arrays of heating elements 1a–4a lie in opposed and facing relation. The linear heating elements 1a and 2a of the upstream row segments 1 and 2 are opposed adjacently in the vertical direction to the linear heating elements 3a and 4a of the downstream row segments 3 and 4 so as to minimize the vertical distance therebetween. The linear heating elements 1a and 2a are aligned along a first horizontal line and the other linear heating elements 3a and 4a are aligned along a second horizontal line in parallel to the first horizontal line at a minimum gap distance. The gap distance is adjusted according to a capacity of the memory for temporarily storing bit image data. The vertical feeding displacement of the thermo-sensitive recording paper 5 is detected by an encoder 6.

Figure 2:
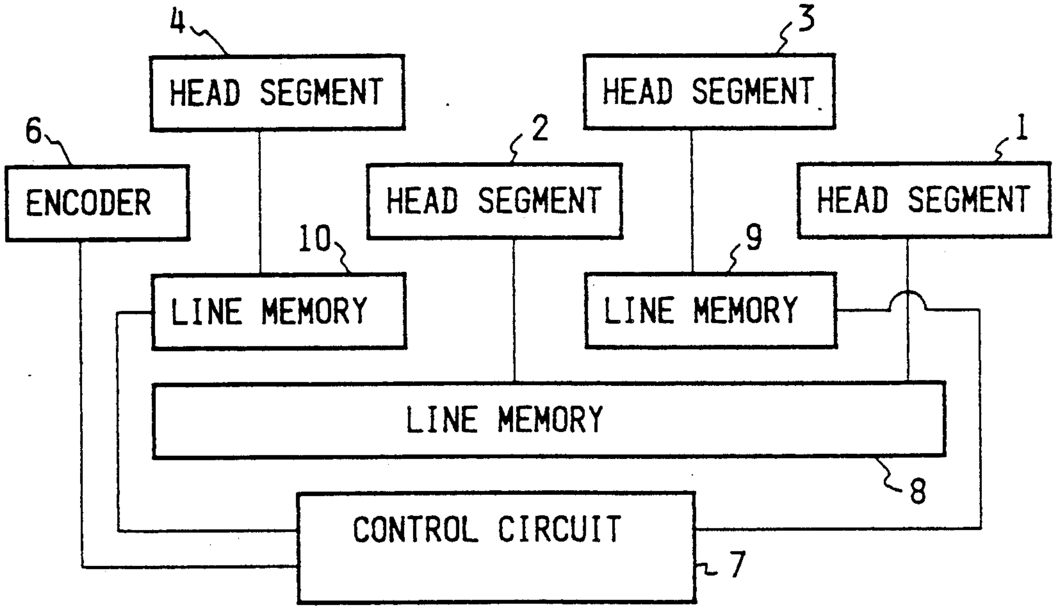
FIG. 2 is a schematic block diagram of the FIG. 1 embodiment.
Figure 3:
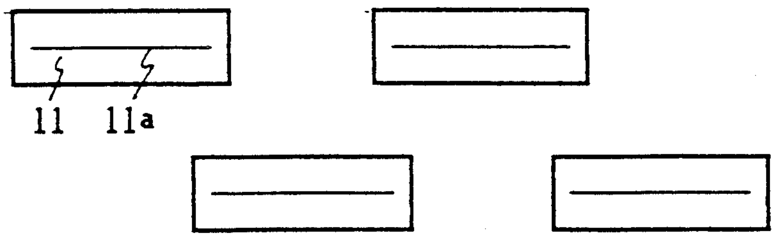
FIG. 3 PRIOR ART
FIG. 3 is a plan view of the conventional staggered line head.

FIG. 2 shows the circuit structure of the FIG. 1 embodiment. A control circuit 7 operates to store sequentially image bit data of each image dot line in a line memory 8, and operates to address-divide the image bit data to transfer them to the thermal head segments 1 and 2 of the upstream row and to a pair of additional or buffer line memories 9 and 10 which temporarily store address-divided image bit data assigned to the head segments 3 and 4 of the downstream row.

In operation, during the starting period, the printer carries out line-sequential printing of dot lines only by the upstream row of segments 1 and 2 according to the assigned image bit data, while the buffer memories 9 and 10 accumulate image bit data to be fed to the downstream row of segments 3 and 4. When the first dot line printed horizontally or widthwise on the recording paper by the first row advances through the gap distance by vertical feeding of the recording paper 5 to reach the position of the downstream row of linear heating elements, the control circuit 7 operates to control the buffer memories 9 and 10 to feed the temporarily stored image bit data therein to the downstream row of the head segments 3 and 4 line by line to thereby carry out dot line printing to complete each dot line printing.

During the vertical or lengthwise feeding of the recording paper, the encoder 6 monitors the feeding amount to detect when the feeding amount reaches the distance corresponding to the adjusted gap between the upstream and downstream rows of the linear heating elements 1a to 4a to thereby determine the timing when the dot line printed by the upstream row reaches the position of the downstream row.

As described above, according to the present invention, the edge type head segments are arranged in staggered relation such that the linear heating elements are opposed adjacently in the feeding direction between the upstream and downstream tows to thereby reduce the vertical distance therebetween. By such arrangement, the memory capacity of the buffer line memory can be reduced to effect a corresponding reduction in coat of the printer. Moreover, the mismatching of a printed dot line can be easily and quickly adjusted in the vertical direction between the pair of upstream and downstream rows.

Figure 4:
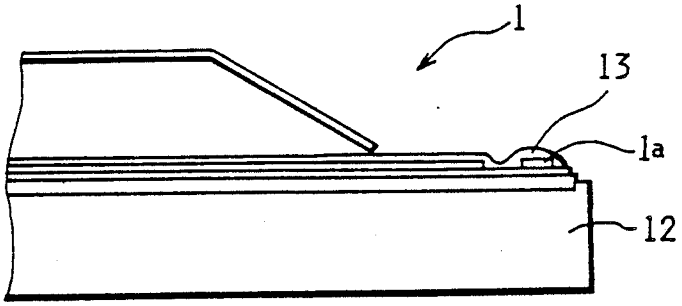
FIG. 4 is a partial section of an edge type head segment used in the FIG. 1 embodiment.

FIG. 4 shows one embodiment of the edge type head segment used in the FIG. 1 embodiment. The head segment 1 is composed of a substrate 12 formed with heating elements 1a disposed along one edge portion of the substrate and covered with a protective film 13.

Figure 5:
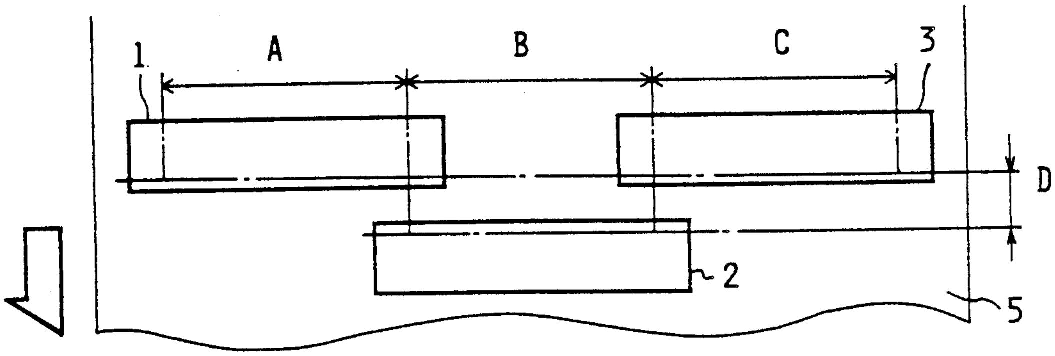
FIG. 5 is a schematic plan view of another embodiment according to the invention.

FIG. 5 shows another embodiment of the invention line thermal printer. The printer is comprised of three thermal head segments 1, 2 and 3 having the a length smaller than the span of the recording paper 5 and being staggered relative to each other. The head segments 1, 2 and 3 have respective effective printing areas A, B and C which are linearly connected in series to each other in the horizontal direction to cover substantially the entire span of the recording paper 5 without superposing with and without separation from each other. The head segments 1 and 3 have heating elements aligned along a horizontal line perpendicular to the vertical feeding direction of the recording paper 5 indicated by the arrow in the figure, and the other head segment 2 has heating elements aligned along another horizontal line parallel to the first-mentioned horizontal line. The pair of head segments 1 and 3 is disposed in an upstream row and the other head segment 2 is disposed in a downstream row.

Figure 6:
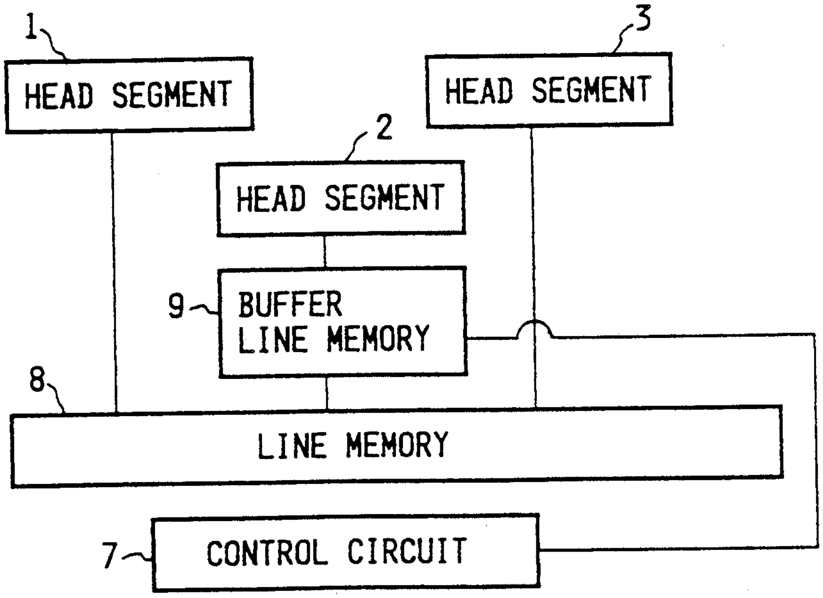
FIG. 6 is a schematic block diagram of the FIG. 5 embodiment.

FIG. 6 shows the circuit structure of FIG. 5 embodiment. The pair of upstream segments 1 and 3 are connected directly to a line memory 8. On the other hand, the downstream head segment 2 is connected through a buffer line memory 9 to the line memory 8. A control circuit 7 is connected to control the transfer of image bit data in the circuit of FIG. 6.

In operation of each dot line printing, the line memory 8 stores image bit data of a single dot line image. The recording paper 5 is fed to the upstream row of the heating elements of segments 1 and 3, and a part of the stored image bit data assigned to the effective printing areas A and C are distributed to the upstream head segments 1 and 3 to effect the printing of dots. At the same time, the remaining image bit data assigned to the effective printing area B are transferred to the buffer line memory 9 and temporarily accumulated therein. When the recording paper 5 is fed through a vertical distance D corresponding to the gap between the upstream and downstream rows of the heating elements such that the partial printed dot line printed by the upstream row of heating elements comes into registration with the downstream row of heating elements, the bit image data is synchronizingly fed from the buffer memory 9 to the head segment 2 to effect the dot printing in registration with the already printed dot line to thereby complete each line printing to record image of the recording paper.

The capacity of buffer line memory 9 is proportional to the product of the distance D between the parallel rows of heating elements and the total width of effective printing area B of the head segments disposed downstream of the paper feeding direction. Therefore, it is advantageous to position a smaller number of head segments of heating elements on the downstream row and to position a greater number of head segments or heating elements on the upstream row in order to reduce the needed capacity of the buffer memory. In general, the total width of the effective printing area of the downstream row of the heating elements should be smaller than that of the upstream row of the heating elements to provide a more inexpensive line thermal printer. The present embodiment is comprised of three head segments, but the present invention can be applied to the staggered line head having a greater number of segments. Further, the present invention can be applied to the thermal printer of the transfer type utilizing a heat transfer ink film.

What is claimed is:

1. A thermal line head device operative while a recording medium is fed in a vertical direction for printing dots line-sequentially along a horizontal direction according to bit image data corresponding to the dots to be printed, the device comprising:

a plurality of longitudinal head segments each having a plurality of heating elements effective to print dots according to the corresponding bit image data, the heating elements of each segment being linearly arranged along a longitudinal edge portion of the segment and deviated from a longitudinal center portion of the segment, the head segments being arranged in staggered relation along upstream and downstream rows such that the longitudinal edge portions of the segments are opposed adjacently to each other in parallel at a given spacing between the rows so as to minimize the vertical distance between the upstream and downstream heating elements;

storing means for storing bit image data; and distributing means for distributing the stored bit image data to the heating elements in synchronization with the vertical feeding of the recording medium through the given vertical spacing.

2. A thermal line head device according to claim 1; wherein the downstream row has a smaller number of heating elements effective to print dots than that of the upstream row.

3. A thermal line head device according to claim 1; wherein the storing means includes a line memory for storing sequentially the bit image data to be assigned to the heating elements, and a buffer memory for temporarily latching a part of the stored bit image data to be fed to a part of the heating elements in the downstream row.

4. A thermal line head device for line-sequentially recording data on a lengthwise advanceable recording medium, comprising: a plurality of elongate thermal head segments, each thermal head segment having a linear array of heating elements extending linearly along a marginal lengthwise edge portion thereof, the thermal head segments being arranged in staggered relation along upstream and downstream rows which extend in the widthwise direction of the recording medium and which are spaced from one another in the lengthwise direction of advancement of the recording medium to jointly and sequentially effect line recording on the recording medium in the widthwise direction thereof as the recording medium advanced lengthwise from the upstream to the downstream row, and the thermal head segments in both rows being disposed so that the marginal edge portions thereof along which extend the linear arrays of heating elements lie in opposed and facing staggered relation to one another.

5. A thermal line head device according to claim 4; wherein the number of thermal head segments in the downstream row is less than that in the upstream row.

6. A thermal line head device according to claim 4; wherein the number of heating elements in the downstream row of thermal head segments is less than that in the upstream row of thermal head segments.

7. A thermal line head device according to claim 4; including storing means for storing image data to be recorded on the recording medium; and distributing means for distributing the stored image data to the two rows of heating elements in synchronization with the lengthwise advancement of the recording medium.

8. A thermal line head device according to claim 7; wherein the storing means comprises line memory means for sequentially storing image data corresponding to sequential lines of image data to be distributed to the upstream and downstream rows of heating elements, and buffer memory means connected to the line memory means to receive therefrom that part of the stored image data to be distributed to the downstream row of heating elements for temporarily storing the same.

9. A thermal line head device according to claim 8; wherein the number of thermal head segments in the downstream row is less than that in the upstream row.

10. A thermal line head device according to claim 8; wherein the number of heating elements in the downstream row of thermal head segments is less than that in the upstream row of thermal head segments.

* * * * *